No. 865,628. PATENTED SEPT. 10, 1907.
J. C. CARSLEY.
VEGETABLE CUTTER.
APPLICATION FILED JAN. 29, 1907.

2 SHEETS—SHEET 1.

Inventor
Josephine C. Carsley

Witnesses
G. R. Thomas
F. B. MacNab

By
Attorneys

THE NORRIS PETERS CO., WASHINGTON, D. C.

No. 865,628. PATENTED SEPT. 10, 1907.
J. C. CARSLEY.
VEGETABLE CUTTER.
APPLICATION FILED JAN. 29, 1907.

2 SHEETS—SHEET 2.

Inventor
Josephine C. Carsley

Witnesses
G. R. Thomas
F. B. MacNab.

By
Attorneys

UNITED STATES PATENT OFFICE.

JOSEPHINE C. CARSLEY, OF CUMBERLAND, WISCONSIN.

VEGETABLE-CUTTER.

No. 865,628.  Specification of Letters Patent.  Patented Sept. 10, 1907.

Application filed January 29, 1907. Serial No. 354,700.

*To all whom it may concern:*

Be it known that I, JOSEPHINE C. CARSLEY, a citizen of the United States, residing at Cumberland, in the county of Barron, State of Wisconsin, have invented certain new and useful Improvements in Vegetable-Cutters; and I do hereby declare the following to be a full, clear, and exact description of the invention, such as will enable others skilled in the art to which it appertains to make and use the same.

This invention relates to vegetable cutters and more particularly to that class which include concentric cylindrical cutting elements with which is connected a handle, and the primary object of the invention is to provide a device of this class the parts of which may be readily dissembled for cleaning or sharpening.

Broadly stated, the invention consists of a pair of cylindrical cutting members, one of which is arranged concentrically within the other, and these members have their upper ends closed and bulged or struck up, the bulged portion of the inner member being received in the corresponding portion of the outer member. Through these bulged portions are formed key-hole slots through which a bolt having a lug at one of its ends is inserted, the said bolt being turned after such insertion and being provided with a nut by means of which the bolt may be attached to a suitable handle, together with the cutting members carried thereby.

It is a well known fact that while cutting up apples and other fruits and vegetables, a fermentation takes place and in order that the gases formed during such fermentation may escape, a number of openings are formed through the closed upper ends of the cylindrical cutting members.

Figure 1:
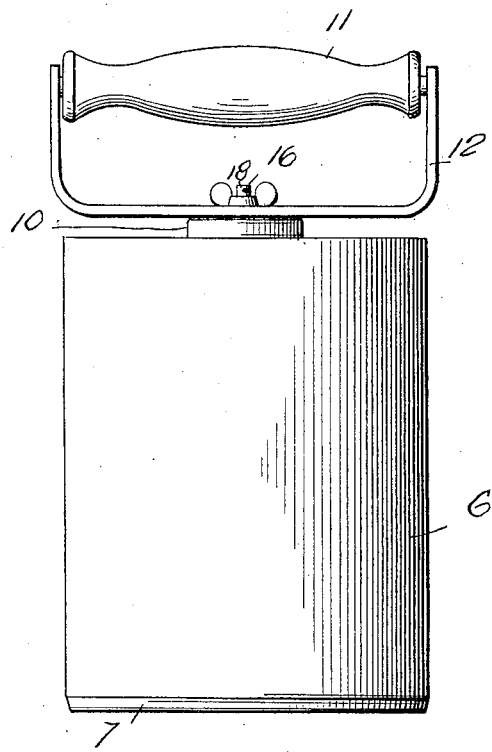
Figure 2:
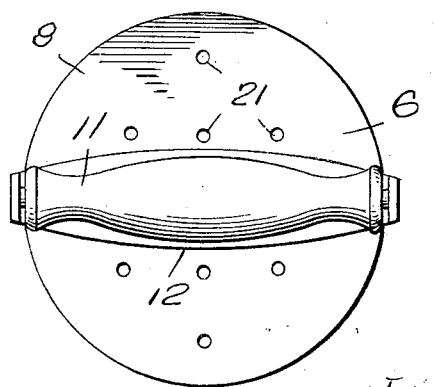
Figure 3:
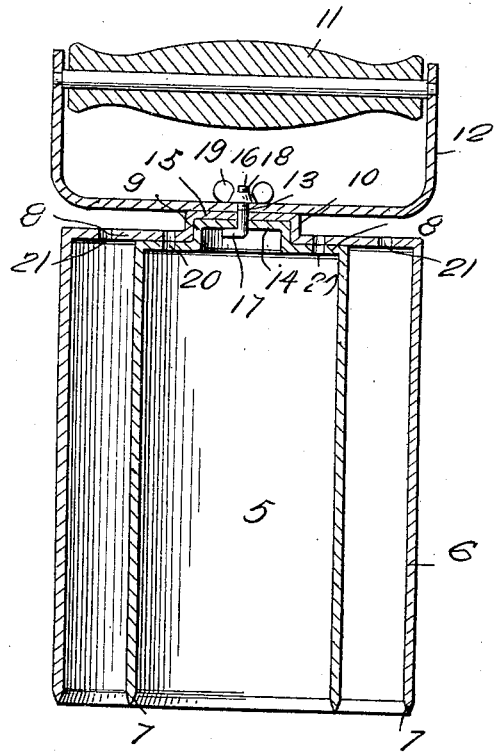
Figure 4:
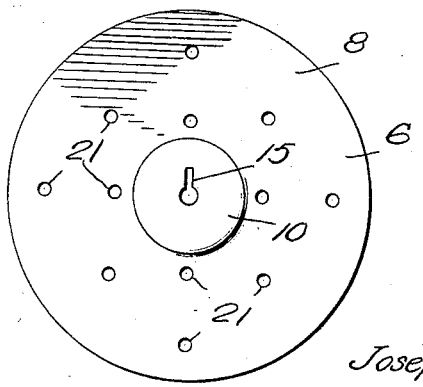

In the accompanying drawings, Figure 1 is a side elevation of my invention. Fig. 2 is a top plan view thereof. Fig. 3 is a detail vertical longitudinal section therethrough, and, Fig. 4 is a top plan view of the outer cylindrical cutting member.

Referring more specifically to the drawings, the numerals 5 and 6 denote respectively the inner and outer cutting members of the device, and each of these members is cylindrical in form, is open at its bottom, and has its lower edge sharpened to form a cutting edge, as indicated by the numeral 7. The upper end of each cylindrical member is closed as at 8, and formed centrally in the closed upper end of the cylinders, are bulged portions 9 and 10 respectively. These bulged portions are cylindrical and concentric with respect to the closed ends in which they are formed, and are of such size that the portion 9 is receivable in the portion 10.

The handle for my device comprises a hand grip 11, to the ends of which are secured the ends of a bowed member 12, which is provided at its middle with an opening 13. When properly connected up, this opening registers with key-hole slots 14 and 15, formed respectively in the bulged portions 9 and 10, and through the opening 13 and the key-hole slots 14 and 15 is engaged a bolt 16, which is provided at its lower end with a laterally extending lug 17, which is inserted through the key-hole slots, the bolt being turned after such insertion. The upper end of the bolt is screw threaded as at 18, for the engagement therewith of a thumb nut 19, which may be turned to tightly secure the bowed portion 12 of the handle to the cylindrical cutting members.

Formed in the closed upper ends of the members 5 and 6 respectively and around their bulged portions, are openings 20 and 21 which register with each other when the members are properly connected, and which serve as a means of escape for the gases of fermentation which are produced when certain vegetables and fruit are chopped.

What is claimed is:

1. A device of the class described comprising a pair of concentric cylindrical cutting members having their lower edges sharpened and having their upper ends closed and formed with concentrically arranged bulged portions, the bulged portion of the inner member being snugly received in the corresponding portion of the outer member whereby the two members will be held in concentric relation, a handle including a bowed portion, the two portions having registering key hole slots formed centrally through their bulged portions, an L-bolt engaged through the slots and through the bowed portion of the handle, and a thumb nut engaged upon the bolt and bearing upon the upper face of the said bowed portion of the handle.

2. A device of the class described comprising a pair of cylindrical cutting members having closed upper ends formed with bulged portions, the bulged portion of one member being received in the corresponding portion of the other member, a handle including a bowed portion, and means connected with the bowed portion of the handle and extending through the bulged portions of the closed ends of the cylindrical cutting member for securing the members together and to the handle.

In testimony whereof, I affix my signature, in presence of two witnesses.

JOSEPHINE C. CARSLEY.

Witnesses:
W. N. HEDBACK,
R. B. HART.